US011941933B2

(12) United States Patent
Ahern et al.

(10) Patent No.: US 11,941,933 B2
(45) Date of Patent: Mar. 26, 2024

(54) ENHANCED ACCESS CONTROL

(71) Applicant: Daon Technology, Dublin (IE)

(72) Inventors: James Ahern, Dunboyne (IE);
Matthew Johnson, Linkwood, MD (US); Gordon Flood, Trim (IE);
Martin Patefield-Smith, Cheltenham (GB)

(73) Assignee: Daon Technology, Dublin (IE)

( * ) Notice: Subject to any disclaimer, the term of this patent is extended or adjusted under 35 U.S.C. 154(b) by 0 days.

(21) Appl. No.: 17/307,010

(22) Filed: May 4, 2021

(65) Prior Publication Data

US 2022/0189231 A1 Jun. 16, 2022

Related U.S. Application Data

(63) Continuation-in-part of application No. 17/122,179, filed on Dec. 15, 2020, now Pat. No. 11,710,361.

(51) Int. Cl.
*G07C 9/37* (2020.01)
*H04L 9/40* (2022.01)
*G06F 3/04842* (2022.01)
*G06V 40/16* (2022.01)
*G06V 40/40* (2022.01)

(52) U.S. Cl.
CPC ............ *G07C 9/37* (2020.01); *H04L 63/0861* (2013.01); *H04L 63/1483* (2013.01); *G06F 3/04842* (2013.01); *G06V 40/166* (2022.01); *G06V 40/45* (2022.01)

(58) Field of Classification Search
CPC .. G07C 9/37; G07C 9/00087; G07C 9/00563; H04L 63/0861; H04L 63/1483; G06V 40/45
See application file for complete search history.

(56) References Cited

U.S. PATENT DOCUMENTS

| 11,361,525 | B2 * | 6/2022 | Andorko | G06V 40/70 |
| 2014/0337948 | A1 * | 11/2014 | Hoyos | H04L 63/0861 726/7 |
| 2019/0172281 | A1 * | 6/2019 | Einberg | G07C 9/00571 |
| 2020/0320808 | A1 * | 10/2020 | Valder | G07C 9/23 |
| 2020/0372743 | A1 * | 11/2020 | Miller | G06V 40/10 |
| 2021/0049847 | A1 * | 2/2021 | Troesch | G07C 9/29 |

* cited by examiner

*Primary Examiner* — Vernal U Brown
(74) *Attorney, Agent, or Firm* — Kevin McDermott, Esq.

(57) ABSTRACT

A method for enhanced access control is provided that includes the steps of displaying buttons, by an electronic device, where each button corresponds to a different service. Moreover, the method includes receiving, by the electronic device, input regarding a selected service, transmitting at least one credential for the selected service to a computer, and capturing, by a camera in communication with the computer, facial image data of a user. The method also includes determining whether the facial image data was taken of a live person. In response to determining the facial image data was taken of a live person, a verification transaction is conducted based on the at least one credential and facial image data. In response to verifying the identity of the user as true, the user is granted access to the selected service.

13 Claims, 10 Drawing Sheets

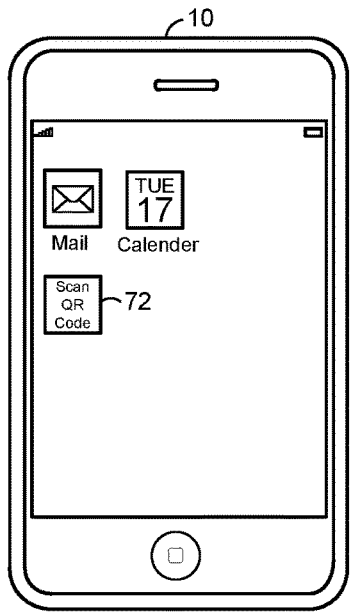
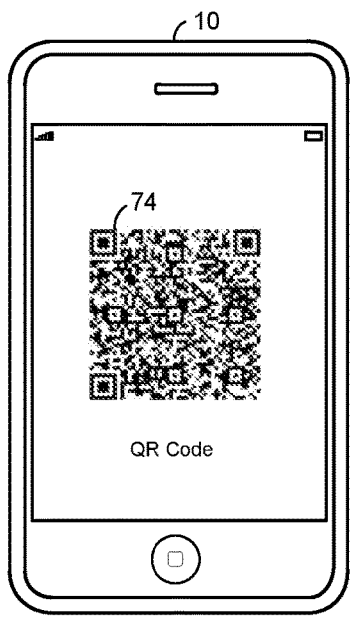
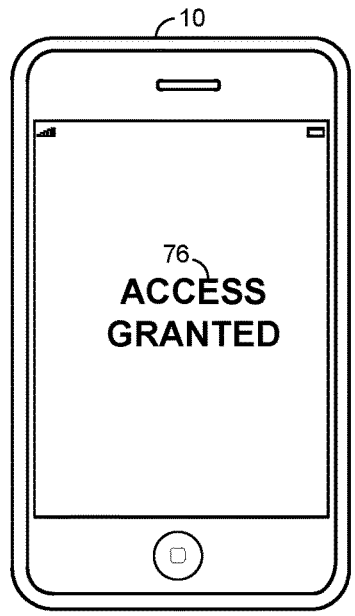
FIG. 5      FIG. 6      FIG. 7
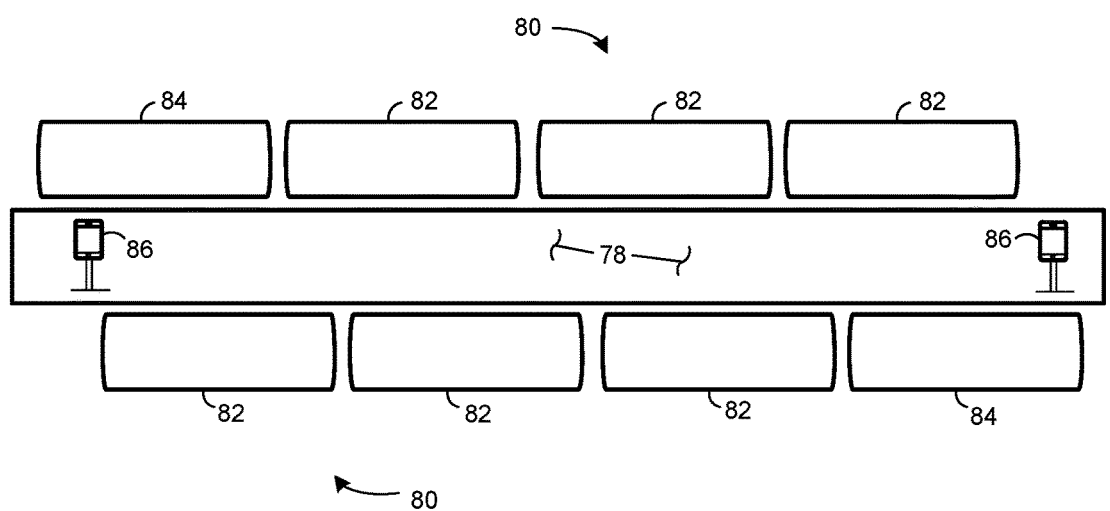
FIG. 8

ENHANCED ACCESS CONTROL

CROSS-REFERENCE TO RELATED APPLICATIONS

This is a continuation-in-part application of U.S. patent application Ser. No. 17/122,179, filed Dec. 15, 2020, the disclosure of which is incorporated herein by reference.

BACKGROUND OF THE INVENTION

This invention relates generally to access, and more particularly, to enhanced access control.

People have been known to wait in lengthy time-consuming queues to access places like transportation hubs, stadiums, and concert halls which provide transportation services, sports entertainment services, and music entertainment services, respectively. In transportation hubs, queue lengths vary with fluctuating traveler volumes, traveler behavior, and resource constraints of transportation hubs, and are known to be particularly burdensome for travelers during or around holiday seasons and during inclement weather. Such burdensome queues may cause travelers to miss, for example, an airplane flight and perhaps a connecting flight resulting in inconvenient, frustrating delays. Additionally, hotels and individuals planning to collect the traveler may need to be notified of delays. Long burdensome queues have also been known to form and cause people to miss part of a sporting event or concert.

Because people are typically close to each other in queues, people are more likely to contract pathogens from each other while in the queue. Additionally, people are typically close to each other at sporting events and while attending concerts. Such queue conditions and proximity may thus present a dangerous health risk for people who are vulnerable to lethal pathogens like the coronavirus.

Transportation hub operators are known to use historical user data to predict the timing of daily, weekly, and holiday user volume surges and allocate resources according to the predictions. Similarly, operators of stadiums and concert halls attempt to use historical data to implement measures to reduce queue lengths and to increase spacing between people during an event. However, despite their best efforts overcrowded queues continue to develop.

Additionally, commercial and non-commercial entities like transportations hubs and governments are known to issue form of identification to, for example, employees and people who use services provided at their facilities. One form of identification typically used is a badge which can be attached to clothing or to a chain which is put around a person's neck. Badges generally include, amongst other things, the name and photograph of the person to whom the badge was issued. Typically, badges are checked by an automated security system or by security personnel in order to access services provided at the facility.

However, it is easy and inexpensive to make a fraudulent badge, for example, by modifying a genuine badge to include a different name, photograph, or both. Fraudulent badges compromise security of facilities and of services available at the facilities. Additionally, it is time consuming and expensive to issue badges, check badges, provide replacement badges and to keep records regarding issued and replacement badges. Thus, it can be seen from the above that known techniques for managing queues, and known techniques for issuing and checking forms of identification have drawbacks.

Thus, it would be advantageous and an improvement over the relevant technology to provide method, a computer, and computer-readable recording medium capable of enhancing user access control to reduce user inconvenience and health risks, as well as to increase security and reduce costs associated with providing secure facilities.

BRIEF DESCRIPTION OF THE INVENTION

An aspect of the present disclosure provides a method for enhanced authorization to access transportation hub services that includes creating, by an electronic device, a token based on credentials of a user. Moreover, the method includes displaying the token by the electronic device for scanning for accessing a security service area and determining whether the credentials are valid. In response to determining the credentials are valid, the user is authorized to access the security service area. Otherwise, the user is denied access to the security service area.

An aspect of the present disclosure provides an electronic device for enhancing authorization to access transportation hub services that includes a processor and a memory configured to store data. The electronic device is associated with a network and the memory is in communication with the processor and has instructions stored thereon which, when read and executed by the processor, cause the electronic device to create a token based on credentials of a user, display the token for scanning for accessing a security service area, and determine whether the credentials are valid. Moreover, the instructions, when read and executed by the processor, cause the electronic device to authorize the user to access the security service area in response to determining the credentials are valid, and deny the user access to the security service area in response to determining at least one of the credentials is invalid.

An aspect of the present disclosure provides a non-transitory computer-readable recording medium in an electronic device for enhancing authorization to access transportation hub services. The non-transitory computer-readable recording medium stores instructions which when executed by a hardware processor cause the non-transitory recording medium to perform steps including creating a token based on credentials of a user, displaying the token for scanning for accessing a security service area, and determining whether the credentials are valid. Moreover, the instructions which when executed by the hardware processor cause the non-transitory recording medium to perform steps including authorizing the user to access the security service area in response to determining the credentials are valid, and denying the user access to the security service area in response to determining at least one of the credentials is invalid.

An aspect of the present disclosure provides a method of enhanced user access control that includes the steps of displaying buttons, by an electronic device, where each button corresponds to a different service. Moreover, the method includes receiving, by the electronic device, input regarding a selected service, transmitting at least one credential for the selected service to a computer, and capturing, by a camera in communication with the computer, facial image data of a user. The method also includes determining whether the facial image data was taken of a live person. In response to determining the facial image data was taken of a live person, a verification transaction is conducted based on the at least one credential and facial image data. In response to verifying the identity of the user as true, the user is granted access to the selected service.

In an embodiment of the present disclosure, the computer or a different computer may determine whether the facial image data was taken of a live person.

In another embodiment of the present disclosure, the computer or the different computer may conduct the verification transaction based on the at least one credential and facial image data.

In an embodiment of the present disclosure, the determining step includes analyzing the facial image data for artifacts indicative of a spoofing attack.

In an embodiment of the present disclosure, the method further comprises the step of discarding the at least one credential and the facial image data when the identity of the user is verified as true.

In an embodiment of the present disclosure the at least one credential is cryptographically signed biometric data of the user.

Another aspect of the present disclosure provides a computer for enhanced user access control that includes a processor and a memory configured to store data. The computer is associated with a network and the memory is in communication with the processor and has instructions stored thereon which, when read and executed by the processor, cause the computer to receive input for a service and at least one credential corresponding to the service, and receive facial image data of the user. Moreover, the instructions when read and executed by the processor cause the computer to determine whether the facial image data was taken of a live person. In response to determining the facial image data was taken of a live person, a verification transaction is conducted based on the at least one credential and facial image data. In response to verifying the identity of the user as true, the user is granted access to the service.

In an embodiment of the present disclosure, the instructions when read and executed by the processor, cause the server to analyze the facial image data for artifacts indicative of a spoofing attack.

In an embodiment of the present disclosure, the instructions when read and executed by the processor, cause the server to discard the at least one credential and the facial image data of the user in response to verifying the identity of the user as true.

In an embodiment of the present disclosure, the service corresponds to one of a plurality of buttons displayed by an electronic device and each button corresponds to at least one credential.

In an embodiment of the present disclosure, the at least one credential is cryptographically signed biometric data of the user.

An aspect of the present disclosure provides a non-transitory computer-readable recording medium in a computer for enhanced user access control. The non-transitory computer-readable recording medium stores instructions which when executed by a hardware processor cause the non-transitory recording medium to perform steps including receiving input for a service and at least one credential corresponding to the service, receiving facial image data of the user, and determining whether the facial image data was taken of a live person. In response to determining the facial image data was taken of a live person, a verification transaction is conducted based on the at least one credential and facial image data. In response to verifying the identity of the user as true, the user is granted access to the service.

In an embodiment of the present disclosure, the instructions when read and executed by the processor, cause the non-transitory computer-readable recording medium to analyze the facial image data for artifacts indicative of a spoofing attack.

In an embodiment of the present disclosure, the instructions when read and executed by the processor, cause the computer to discard the received at least one credential and the received facial image data of the user in response to verifying the identity of the user as true.

In an embodiment of the present disclosure, the service corresponds to one of a plurality of buttons displayed by an electronic device and each button corresponds to at least one credential.

In an embodiment of the present disclosure, the at least one credential is cryptographically signed biometric data of the user.

BRIEF DESCRIPTION OF THE DRAWINGS

FIG. 5 is an enlarged plan view of the computing device displaying buttons and/or icons;

FIG. 6 is an enlarged plan view of the computing device displaying a QR Code;

FIG. 7 is an enlarged plan view of the computing device displaying a message ACCESS GRANTED;

FIG. 8 is a top view of an example train platform including a train on each side of the platform;

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
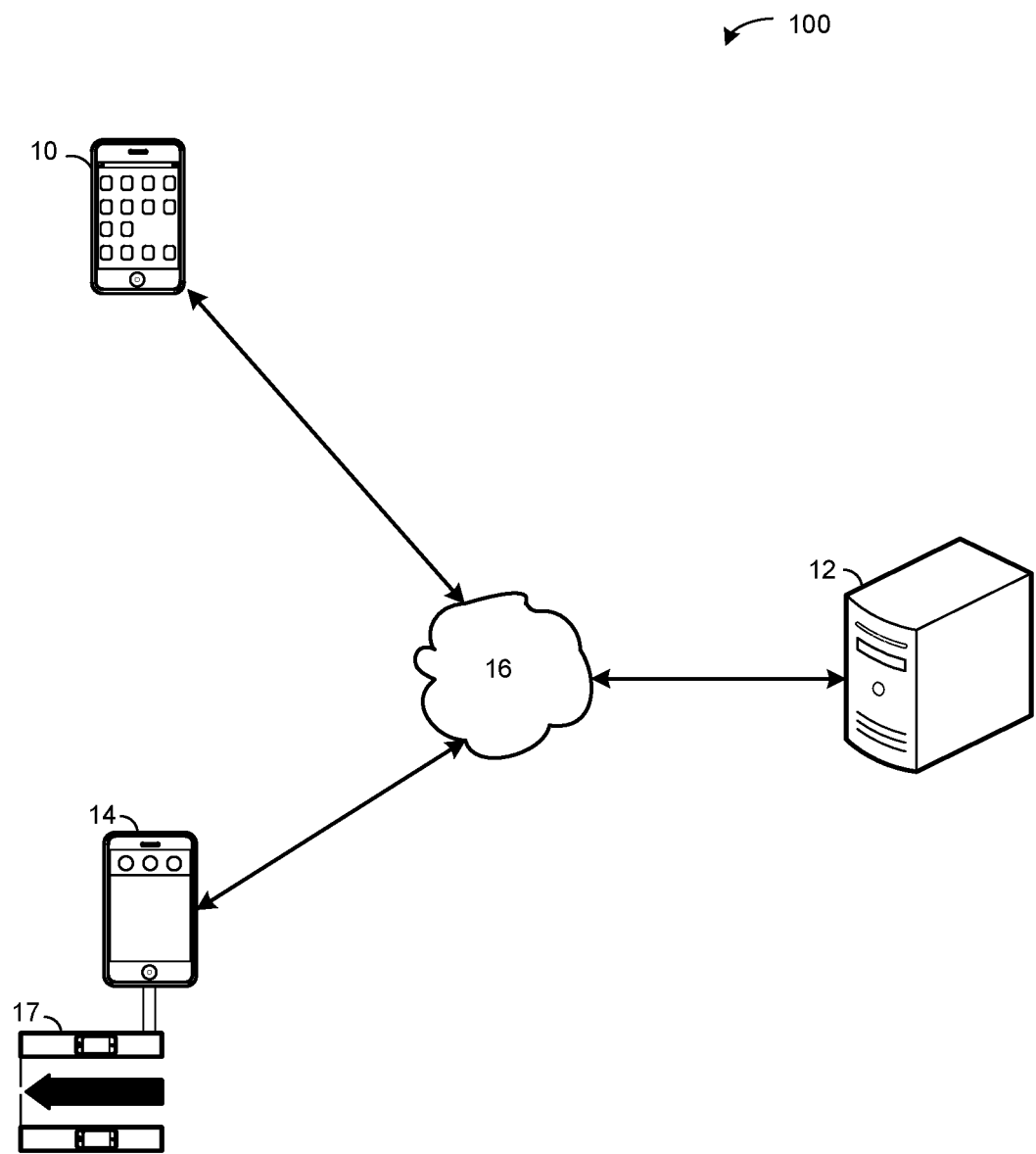
FIG. 1 is a schematic diagram of an example computing system for enhanced user access control according to an embodiment of the present disclosure.

FIG. 1 is a schematic diagram of an example computing system 100 for enhanced access control according to an embodiment of the present disclosure. As shown in FIG. 1, the main elements of the system 100 include a computing device 10, a verification server 12, and an access control management computer (ACMC) 14 communicatively connected via a network 16.

In FIG. 1, the computing device 10 can be any wireless hand-held consumer electronic device capable of at least downloading applications over the Internet, running applications, capturing and storing data temporarily and/or permanently, and otherwise performing any and all functions described herein by any computer, computer system, server or computing device included in the system 100. One example of the computing device 10 is a smart phone. Other examples include, but are not limited to, a cellular phone, a tablet computer, a phablet computer, a laptop computer, and any type of hand-held consumer electronic device having wired or wireless networking capabilities capable of performing the functions, methods, and/or algorithms described herein.

Each computing device 10 is typically associated with a single person who operates the device. However, it is contemplated by the present disclosure that each computing device 10 may alternatively be associated with more than one person, for example, a husband and wife. The person who is associated with and operates the computing device 10 is referred to herein as a user. Users include, but are not limited to, airline company employees, university students and faculty, Transportation Security Administration (TSA) security personnel, sports fans, museum goers, concert goers, and any person desiring access to a physical location.

The verification server 12 can be, for example, any type of server or computer implemented as a network server or network computer. The computing device 10 and verification server 12 may alternatively be referred to as an electronic device or an information system.

The ACMC 14 can be any wireless consumer electronic device capable of at least downloading applications over the Internet, running applications, capturing and storing data temporarily and/or permanently, conducing verification transactions and liveness detection, and otherwise performing any and all functions described herein by any computer, computer system, server or computing device included in the system 100. One example of the ACMC 14 is a tablet computer. Other examples include, but are not limited to, a phablet computer, a laptop computer, and any type of consumer electronic device having wired or wireless networking capabilities capable of performing the functions, methods, and/or algorithms described herein. The ACMC 14 can be mounted to or otherwise connected to an access control mechanism (ACM) 17. Additionally, the ACMC 14 can communicate with the ACM 17 via a wired or wireless connection.

The ACMC 14 can at least obtain data stored in a chip of a document to verify a user's identity. For example, biometric template data stored in the chip may be obtained and transmitted to the verification server 12 for biometrically verifying the identity of the user. Additionally, the ACMC 14 may capture data regarding biometric modalities of users. One example of an ACM 17 is an electronic gate (eGate). In response to the identity of a user being successfully verified, the ACM 17 may cause a physical barrier such as a gate or turnstile to open and permit access to a service. Thus, access control to a service is enhanced.

It is contemplated by the present disclosure that the operations performed by the ACMC H and the verification server 12 may be implemented by a single computer system, for example, the ACMC 14 only or the verification server 12 only. When implemented by the ACMC 14 the verification server 12 may not be included in the system 100.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of computing devices 10, verification servers 12, and ACMCs 14 is not limited to the number of computing devices 10, verification servers 12, and ACMCs 14 shown in FIG. 1.

Figure 2:
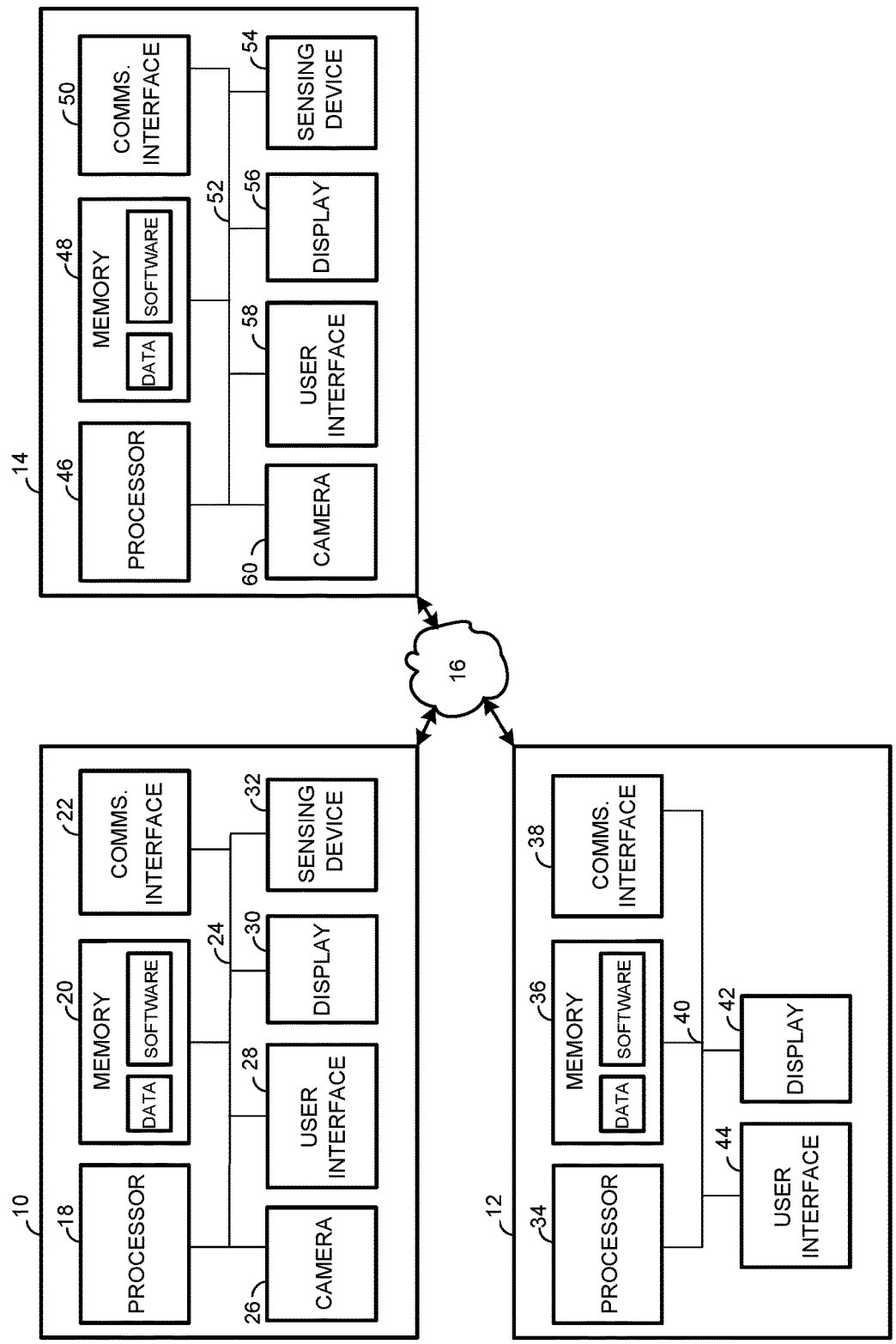
FIG. 2 is a more detailed schematic diagram illustrating a computing device, a verification server, and an access control management computer (ACMC) in the system of FIG. 1.

FIG. 2 is a more detailed schematic diagram illustrating the computing device 10, the verification server 12, and the ACMC 14 in the system 100 for enhanced access control according to an embodiment of the present disclosure. Although FIG. 2 shows one computing device 10, one ACMC 14, and one verification server 12, the computing device 10, the ACMC 14, and the verification server 12 in the figure are meant to be representative of additional computing devices 10, ACMCs 14, and verification servers 12 that may be included in the system 100 shown in FIG. 1.

The computing device 10 includes components such as, but not limited to, one or more processors 18, a memory 20, a communications interface 22, a bus 24, a camera 26, a user interface 28, a display 30, and a sensing device 32. General communication between the components in the computing device 10 is provided via the bus 24.

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMS, any type of physical and/or virtual storage, or any other digital source such as a network or the Internet from which computer programs, applications or executable instructions can be read.

The memory 20 may be used to store any type of data, for example, data records of users. Each data record is typically for the user or users associated with a respective computing device 10. The data record for each user may include data such as, but not limited to, electronic tokens, health questionnaires, messages for prompting users to perform an action, biometric modality data, biometric templates, and personal data. Biometric modality data is the data of a biometric modality of a person captured by the computing device 10. Biometric modalities include, but are not limited to, voice, face, finger, iris, palm, any other modalities, and any combination of modalities. Biometric modality data may be in any form including, but not limited to, image data and audio data. Image data may be a digital image, a sequence of digital images, or a video. Each digital image is included in a frame. The biometric modality data in the data record may be processed to generate at least one biometric template.

Biometric modality data may be captured in any manner. For example, for voice biometric data the computing device 10 may record a user speaking. For face biometric data, the camera 26 may record image data of the face of a user by taking one or more photographs or digital images of the user, or by taking a video of the user. The camera 26 may record a sequence of digital images at irregular or regular intervals. A video is an example of a sequence of digital images being captured at a regular interval. Captured biometric modality data may be temporarily or permanently stored in the computing device 10 or in any device capable of communicating with the computing device 10 via the network 16. As used herein, capture means to record temporarily or permanently, any data including, for example, biometric modality data of a person.

The process of verifying the identity of a person is known as a verification transaction. Typically, during a verification transaction a biometric template is generated from biometric modality data of a person captured during the transaction. The generated biometric template is compared against a corresponding record biometric template of the person and a matching score is calculated for the comparison. If the matching score meets or exceeds a threshold score, the identity of the person is verified as true. Alternatively, the captured biometric modality data may be compared against corresponding record biometric modality data to verify the identity of the person. An authentication data requirement is the biometric modality data desired to be captured during a verification or identification transaction.

Biometric data includes data from a unique biological or behavioral characteristic of a human that can be used to identify a person. Examples of biometric data include, but are not limited to, biometric modality data, biometric data, features, embeddings, and summary statistics.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Any type and number of credentials may also be stored in the memory 20. Example credentials include, but are not limited to, a biometric credential, a health credential and a reservation credential. The memory 20 may also store an identifier for the computing device 10. The identifier may include any type of character and may be, for example, all numbers, all letters, and alphanumeric. The identifier may be of any length.

Additionally, the memory 20 can be used to store any type of software. As used herein, the term "software" is intended to encompass an executable computer program that exists permanently or temporarily on any non-transitory computer-readable recordable medium that causes the computing device 10 to perform at least a portion of the functions, methods, and/or algorithms described herein. Application programs are software and include, but are not limited to, operating systems, Internet browser applications, enrolment applications, applications for accessing various types of services like travel services, and any other software and/or any type of instructions associated with algorithms, processes, or operations for controlling the general functions and operations of the computing device 10. The application for accessing various types of services can be downloaded from a digital distribution service via the network 16 using the computing device 10 or similar device. The software may also include computer programs that implement buffers and use RAM to store temporary data.

When executed by the processor 18, the applications for accessing various services can cause the computing device 10 to perform operations such as, but not limited to, capturing personal data about a user, capturing answers to a health questionnaire, creating a health credential for a user, creating a reservation credential for a user, creating an electronic token based on the health and reservation credentials for a user, displaying the electronic token, displaying an icon that includes a message for performing an action, determining whether or not a health credential was created within a period of time, and determining whether or not a reservation credential is for a current time. One example of the message is "Show QR Code".

The communications interface 22 may include various network cards, and circuitry implemented in software and/or hardware to enable wired and/or wireless communications with other computing devices 10 (not shown), the verification server 12, and the ACMC 14 via the network 16. Communications include, for example, conducting cellular telephone calls and accessing the Internet over the network 16. By way of example, the communications interface 22 may be a digital subscriber line (DSL) card or modem, an integrated services digital network (ISDN) card, a cable modem, or a telephone modem to provide a data communication connection to a corresponding type of telephone line. As another example, the communications interface 22 may be a local area network (LAN) card (e.g., for Ethernet™ or an Asynchronous Transfer Model (ATM) network) to provide a data communication connection to a compatible LAN. As yet another example, the communications interface 22 may be a wire or a cable connecting the computing device 10 with a LAN, or with accessories such as, but not limited to, other computing devices. Further, the communications interface 22 may include peripheral interface devices, such as a Universal Serial Bus (USB) interface, a PCMCIA (Personal Computer Memory Card International Association) interface, and the like.

The communications interface 22 also allows the exchange of information across the network 16. The exchange of information may involve the transmission of radio frequency (RF) signals through an antenna (not shown). Moreover, the exchange of information may be between the computing device 10, the verification server 12, the ACMC 14, other computing devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The computing devices (not shown) may be associated with any user or with any type of entity including, but not limited to, commercial and non-commercial entities.

The camera 26 captures image data. The camera 26 can be one or more imaging devices configured to record image data of at least a portion of the body of a user including any biometric modality of the user while utilizing the computing device 10. Image data captured using the imaging devices may be used for implementing liveness detection techniques based on depth perception, and if arranged into a three-dimensional (3D) camera system can implement liveness detection techniques based on structural lighting techniques.

The camera 26 is capable of recording image data under any lighting conditions including infrared light. The camera 26 may be integrated into the computing device 10 as one or more front-facing cameras and/or one or more rear facing cameras that each incorporates a sensor, for example and without limitation, a CCD or CMOS sensor. Alternatively, the camera 26 can be external to the computing device 10.

The user interface 28 and the display 30 allow interaction between a user and the computing device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a keyboard, a mouse, an illuminator, a signal emitter, a microphone, and/or speakers.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the computing device 10 to enter data, change settings, control functions, etc. Consequently, when the touch screen is touched, the user interface 28 communicates this change to the processor 18, and settings can be changed or user entered information can be captured and stored in the memory 20. The display 30 may function as an illumination source to apply illumination to an object while image data for the object is captured.

For user interfaces 28 that include an illuminator, the illuminator may project visible light, infrared light or near infrared light on a biometric modality, and the camera 26 may detect reflections of the projected light off the biometric modality. The reflections may be off of any number of points on the biometric modality. The detected reflections may be communicated as reflection data to the processor 18 and the memory 20. The processor 18 may use the reflection data to create at least a three-dimensional model of the biometric modality and a sequence of two-dimensional digital images. For example, the reflections from at least thirty thousand discrete points on the biometric modality may be detected and used to create a three-dimensional model of the biometric modality. Alternatively, or additionally, the camera 26 may include the illuminator.

The sensing device 32 may include Radio Frequency Identification (RFID) components or systems for receiving information from other devices in the system 100 and for transmitting information to other devices in the system 100. The sensing device 32 may alternatively, or additionally, include components with Bluetooth, Near Field Communication (NFC), infrared, or other similar capabilities. Communications between the computing device 10 of the user and the ACMC 14 may occur via NFC, RFID, Bluetooth or the like only so a network connection from the computing device 10 is not necessary. Similarly, communications between the ACMC 14 and the AMC 17 may occur via NFC, RFID, Bluetooth or the like.

The verification server 12 can be, for example, any type of server or computer implemented as a network server or network computer and can include components similar those described herein with reference to the computing device 10. More specifically, the verification server 12 can include components such as, but not limited to, one or more processors 34, a memory 36, a communications interface 38, a bus 40, a display 42, and a user interface 44. General communication between the components in the verification server 12 is provided via the bus 40.

The processor 34 is similar to the processor 18 described herein with regard to the computing device 10. Additionally, the memory 36 is similar to the memory 20 described herein with regard to the computing device 10. However, the non-alterable or fixed memory can additionally be implemented using an optical ROM disc, such as a CD-ROM or DVD ROM disc. The memory 36 may be used to store any type of data, for example, user data records similar to those described herein for the memory 20. The memory 36 may temporarily or permanently store image data including, but not limited to; photographs obtained from an external source, for example, an employer; photographs taken from a picture of the drivers license or other identity document of a user; and, photographs taken from the electronic record read from a passport chip or other electronic document of a user. The biometric templates created from such photographs may also be temporarily or permanently stored in the memory 36 and can be referred to as record biometric templates. Furthermore, the memory 36 can be used to store any type of software including, for example, the software described herein as being stored in the memory 20.

The user interface 44 is similar to the user interface 28 described herein with regard to the computing device 10. Moreover, the display 42 and communications interface 38 are similar to the display 30 and communications interface 22, respectively, described herein with regard to the computing device 10.

Information such as, but not limited to, test results for a pathogen, a vaccination card, biometric data, and government mandated immigration entry forms may be used as credentials. It is contemplated by the present disclosure that the verification server 12 may also create a credential from any of this information alone or in combination. For example, the verification server 12 can create biometric credentials from facial image data captured by the computing device 10. The biometric credential can be transmitted to the computing device 10.

Additionally, the verification server 12 can verify the identity of users, detect whether or not captured biometric modality data was taken of a live person and check user documents, for example, driver licenses and passports. Checking user documents includes, for example, conducting optical character recognition so information can be extracted from the document to determine the authenticity of the document and whether or not the credential has expired.

The ACMC 14 can be any wireless consumer electronic device capable of at least downloading applications over the Internet, running applications, capturing and storing data temporarily and/or permanently, conducting verification transactions and liveness detection, and otherwise performing any and all functions described herein by any computer, computer system, server or computing device included in the system 100. One example of the ACMC 14 is a tablet computer. Other examples include, but are not limited to, a phablet computer, a laptop computer, and any type of consumer electronic device having wired or wireless networking capabilities capable of performing the functions, methods, and/or algorithms described herein. The ACMC 14 can be mounted to or otherwise connected to an access control mechanism (ACM) 17. Additionally, the ACMC 14 can communicate with the ACM 17 via a wired or wireless connection. The AMC 17 can be any automated self-service barrier, for example, an electronic gate (eGate).

The ACMC 14 can obtain data stored in a chip of a document and can transmit the obtained data to a computer system, for example, the verification server 12 which can verify the identity of the user based on the obtained data. Alternatively, the ACMC 14 may verify the identity of the user utilizing the obtained data. For example, biometric template data stored in the chip of a document may be obtained and used to biometrically verify a user's identity. The ACMC 14 may also verify the identity of users, detect whether or not captured biometric modality data was taken of a live person and check user documents, for example, driver licenses and passports.

The data can be obtained from the chip using RFID, Bluetooth, NFC, infrared, or other similar capabilities. In response to the identity of a user being successfully verified, a message can be transmitted to the ACM 17 which can cause a physical barrier such as a gate or turnstile to open and to permit access to a service. Thus, access control is enhanced.

The ACMC 14 can include components such as, but not limited to, one or more processors 46, a memory 48, a communications interface 50, a bus 52, a sensing device 54, a display 56, a user interface 58, and a camera 60. General communication between the components in the ACMC 14 is provided via the bus 52.

The processor 46 and memory 48 are similar to the processor 18 and memory 20, respectively, described herein with regard to the computing device 10. Additionally, the memory 48 may be used to store any type of data, for example, data of a biometric modality captured during a verification transaction, data of a biometric modality of a user obtained from a document presented by the user, any other type of biometric data, and personal data about the user. Furthermore, the memory 40 can be used to store any type of software including the software described herein as being stored in the memory 20 as well as, for example, software for conducting verification transactions.

The communications interface 50, sensing device 54, and display 56 are similar to the communications interface 22, sensing device 32, and display 30, respectively, described herein with regard to the computing device 10. The camera 60 may be similar to the camera 26 in the computing device 10 or may be any camera suitable for capturing data of biometric modalities.

The user interface 58 can be similar to the user interface 28 described herein with regard to the computing device 10. Additionally, the user interface 58 includes a scanner for scanning documents presented by users. By virtue of scanning a document, for example, a passport the ACMC 14 can capture information about the user associated with the passport and check whether the document is authentic and whether or not the document has expired. The ACMC 14 may also scan electronic tokens displayed by the computing device 10 of a user, and the scanned token and/or data related to the token may be communicated to another device included in the system 100, for example, the verification server 12. Alternatively, or additionally, the ACM 17 may scan and check documents, scan electronic tokens displayed by the computing device 10, and may transmit the scanned data to other devices in the system 100, for example, the verification server 12 and the ACMC 14.

Figure 3:
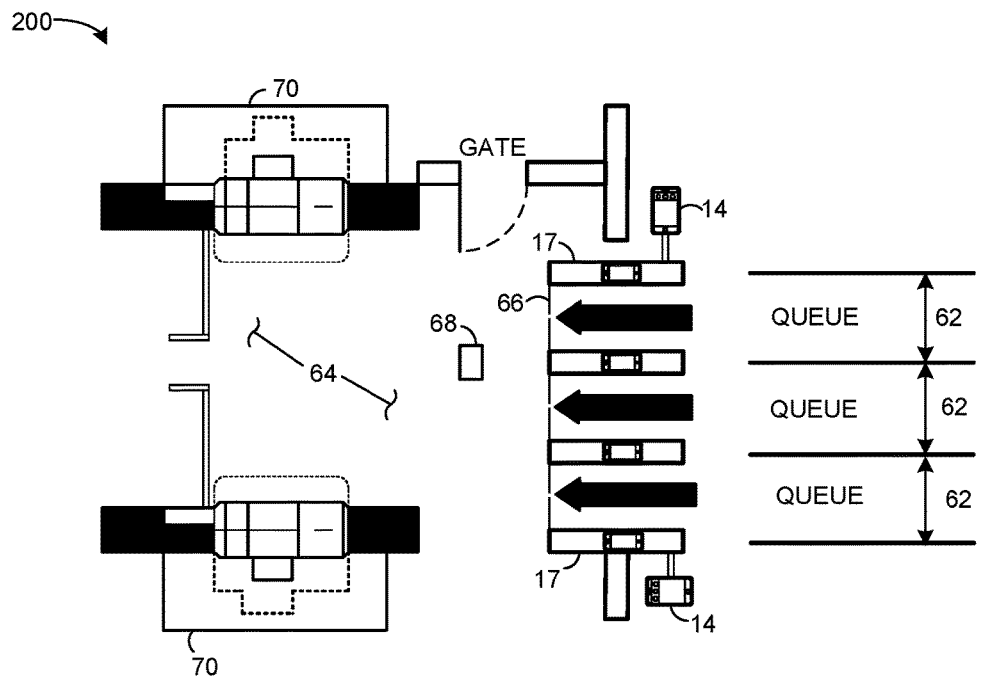
FIG. 3 is a top view of an example security checkpoint.

FIG. 3 is a top view of an example security checkpoint 200 that can be deployed at any location where security may be a concern. Such locations include, but are not limited to, transportation hubs, museums, banks, public libraries, convention centers, sports stadiums, office buildings, shopping malls, warehouses, and movie theaters. Example modes of transportation include, but are not limited to, airplanes, trains, subways, automobiles, and buses. Transportation hubs can be any facility that accommodates a mode of transportation and include, but are not limited to, airports, train stations, and bus depots.

The security checkpoint 200 can include, for example, ACMCs 14, a lane or aisle 62 corresponding to the space between pairs of ACMCs 14, and an area 64 for providing security services to users. The area 64 is an example location to which users may desire physical access in order to access the security services. The ACMs 17 may each include a mechanism 66 for preventing users from entering the area 64. Such mechanisms 66 include, but are not limited to, a turnstile, an electronic door, and a swing gate. Although an ACMC 14 is shown mounted on two of the ACM's 17, it is contemplated by the present disclosure that each ACM 17 may have a corresponding ACMC 14 mounted thereon or otherwise connected thereto.

Each lane or aisle 62 accommodates a queue of users desiring to pass through a respective pair of ACMs 17 to access the security service in the area 64. The area 64 can also include a walk-through metal detector 68 for screening users and X-ray machines 70 for screening personal belongings. It is contemplated by the present disclosure that any deployment of the area 64 may include the metal detector 68 and X-ray machine 70, the metal detector 68 or X-ray machine 70, or neither the metal detector 68 nor the X-ray machine 70.

Figure 4:
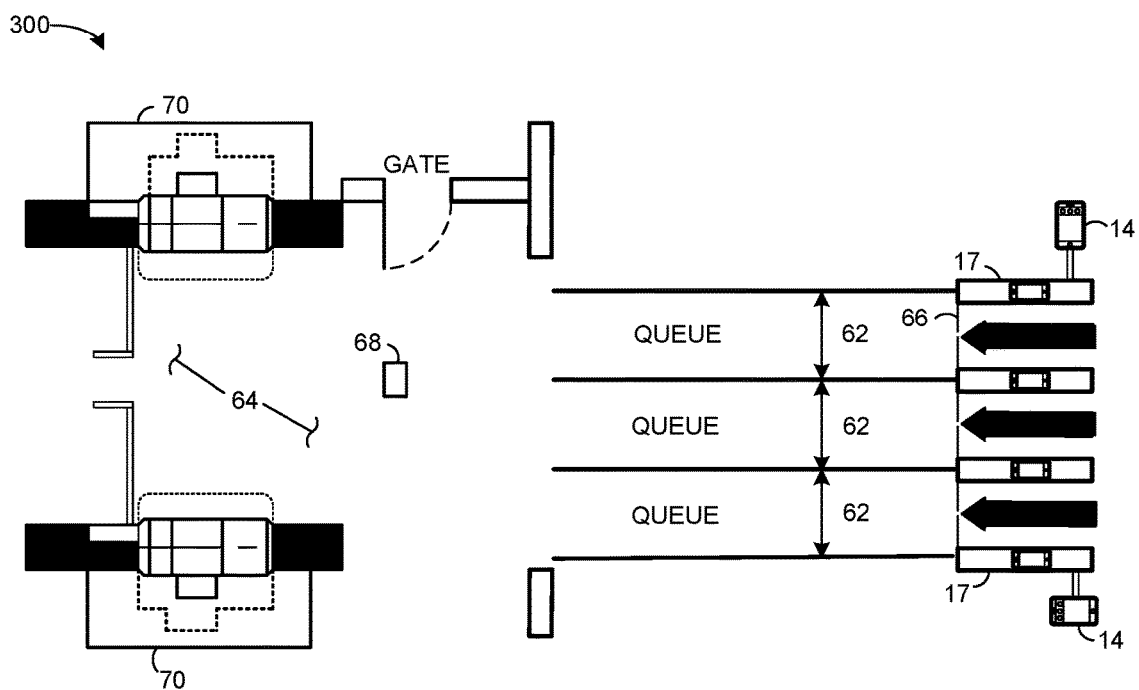
FIG. 4 is a top view of the security checkpoint shown in FIG. 3 with the ACMCs in a different location.

The information shown in FIG. 4 is the same information shown in FIG. 3 as described in more detail below. As such, features illustrated in FIG. 4 that are identical to features illustrated in FIG. 3 are identified using the same reference numerals used in FIG. 3.

FIG. 4 is a top view of another example security checkpoint 300 similar to the checkpoint 200 shown in FIG. 3. However, each ACM 17 is located at the entrance to an aisle 62 which allows identifying a user without a valid electronic token before the user enters a queue. Thus, the number of users in a queue is facilitated to be reduced. As a result, user delays, inconvenience, and frustration are facilitated to be reduced. Moreover, with fewer users in the queue it is easier to practice social distancing to facilitate reducing transmission of pathogens between users.

People have been known to wait in lengthy time-consuming queues to access physical entities like transportation hubs, stadiums, and concert halls. In transportation hubs, queue lengths vary with fluctuating traveler volumes, traveler behavior, and resource constraints of transportation hubs, and are known to be particularly burdensome for travelers during or around holiday seasons and during inclement weather. Such burdensome queues may cause travelers to miss, for example, an airplane flight and perhaps a connecting flight resulting in inconvenient, frustrating delays. Additionally, hotels and individuals planning to collect the traveler may need to be notified of delays. Long burdensome queues have also been known to form and cause people to miss part of a sporting event or concert.

Because people are typically close to each other in queues, people are more likely to contract pathogens from each other while in the queue. Additionally, people are typically close to each other at sporting events and while attending concerts. Such queue conditions and proximity may thus present a dangerous health risk for people who are vulnerable to lethal pathogens like the coronavirus.

To address this problem, each user can utilize his or her computing device 10 to create and display an electronic token for scanning by the ACMC 14. The electronic token can be created from any type of credential including, but not limited to, a biometric credential, a health credential, a reservation credential, a vaccination card, a test result for a pathogen, a government mandated immigration entry form, and any combination thereof. In one example embodiment, to address these problems the ACMC 14 can transmit the scanned token and/or data about the token, to the verification server 12 which can determine whether or not the token is valid. If valid, the verification server 12 can transmit a message to the ACMC 14 indicating the token is valid and the user associated with the token is authorized to pass through the ACM 17 and access the security service in the area 64. Otherwise, if the token is invalid a message can be transmitted to the ACMC 14 indicating the token is invalid and the user is not authorized to access the security service area 64. Thus, access control to the security service is enhanced.

In order to obtain an electronic token based on health and reservation credentials, each user can be required to obtain a health credential and a reservation credential before arriving at a location, for example, the area 64 in a transportation hub. Alternatively, users may obtain the credentials at the transportation hub but before attempting to pass through an ACMC 14. The health credential can be obtained by satisfactorily completing a health questionnaire which is a series of questions about the health of the user. The questions may enquire about, for example, whether the user has been tested for a pathogen and if so the result and date of the test. Additional questions may include, but are not limited to, whether the user has a fever and has been in contact with a person infected with a pathogen. If the user has been in contact with a person infected with a pathogen, another question may enquire about the length of time since contact. It is contemplated by the present disclosure that the questionnaire may include any number of questions and that any question relating to the health of a user may be included.

A user may utilize his or her computing device 10 to download the questionnaire over the network 16 and to answer the questions. The answers can be transmitted to the verification server 12 to determine if the user constitutes a health risk to other users based on the answers. After determining the user does not constitute a health risk, an electronic health credential is created and transmitted to the computing device 10 of the user.

A user is considered a risk to other users when an answer indicates he or she may transmit a pathogen like the coronavirus to others. For example, it is recommended that people who may have been in contact with an infected person quarantine for fourteen days. Thus, a person who answers that he or she was in contact with an infected person within fourteen days of the travel date is considered a health risk to others.

It is contemplated by the present disclosure that the health credential be created no more than twenty-four hours before a user attempts to access, for example, the security service in the area 64. Alternatively, the health credential may be created any period of time before attempting to access a service that inhibits the spread of a pathogen like the coronavirus.

The computing device 10 of a user can also be used to obtain an electronic reservation credential. More specifically, a user can operate his or her computing device 10 to reserve a period of time to wait in a queue and physically access the security service in the area 64. The period of time may be, for example, fifteen minutes. Alternatively, the period of time may be of any duration that enables users to pass through the security checkpoint 200 without delay while ensuring social distancing and other health safety measures can be practiced. Such health safety measures include, but are not limited to, checking users for a fever. After reserving a period of time, the verification server 12 can create and transmit a reservation credential to the computing device 10 of the user. The reservation credential is valid during the reserved time only.

FIG. 5 is an enlarged plan view of the computing device 10 displaying buttons and/or icons. One button 72 includes a message that reads "Scan QR Code". The displayed button 72 is typically pressed, touched or otherwise operated when the user arrives at an ACM 17. In response to the "Scan QR Code" button 72 being pressed, touched or otherwise operated, the computing device 10 can create an electronic token based on the health credential and the reservation credential of the user. The token can include, for example, the identifier of the user's computing device 10, the user's email address, and any other information relating to the user. Additionally, it is contemplated by the present disclosure that the electronic token may be any type of token, including, but not limited to, a QR code and a bar code. The created electronic token can also be displayed by the computing device 10.

The user presents the computing device 10 displaying the electronic token to the scanner in the ACMC 14. The ACMC 14 scans the token and can transmit the scanned token and/or data about the token, to the verification server 12 which can determine whether or not the token is valid. If valid, the verification server 12 can transmit a message to the ACMC 14 indicating the token is valid and the user associated with the token is authorized to access the security service in the area 64. In response, the ACMC 14 can transmit a message to the ACM 17 which causes the mechanism 66 to open and permit the user to access the security service in the area 64. Additionally, the ACMC 14 can transmit a message to the computing device 10 and in response the computing device 10 may display a message indicating the user is authorized to access the security service in the area 64.

Otherwise, if the token is invalid a message can be transmitted to the ACMC 14 indicating the token is invalid and the user is not authorized to access the security service in the area 64. In response, the ACMC 14 does not transmit a message to the ACM 17 so the mechanism 66 does not open and the user is not granted access to the security service in the area 64. The ACMC 14 may also transmit a message to the computing device 10 indicating the user is not authorized. In response, the computing device 10 may display a message indicating the user is denied access to the security service in the area 64. The token is invalid when at least one of the health and reservation credentials is invalid.

Although the ACMC 14 can transmit the scanned token and/or data about the token to the verification server 12 after scanning the electronic token, the ACMC 14 may alternatively transmit the scanned token and/or data about the token to the computing device 10. Thus, it is contemplated by the present disclosure that the computing device 10 may alternatively determine whether or not the token is valid and as a result that the user is authorized or not authorized to access the security service in the area 64. The computing device 10 may transmit a message to the ACMC 14 indicating the user is authorized or not authorized to access the security service. After receiving the message, the ACMC 14 may communicate with the ACM 17 according to the received message and the mechanism 66 is operated according to the received message. Additionally, the computing device 10 may display a message indicating the user is authorized or not authorized to access the security service in the area 64.

Although the button 72 includes a message that reads "Scan QR Code", the button 72 may alternatively include a message that reads "Show QR Code" when the token is a QR code or "Scan the bar code" or "Show the Bar Code" when the token is a bar code. Instead of the electronic token being created by the computing device 10 in response to the button 72 being touched, pressed or otherwise operated, the computing device 10 may communicate with the verification server 12 such that the verification server 12 creates the electronic token and transmits the token to the computing device 10 for display. Although the message is displayed as part of a button, it is contemplated by the present disclosure that the message may alternatively be displayed in any manner, for example, as large bold text across the display 30. For such a message, the electronic token may be created when the large bold text is touched or pressed.

FIG. 6 is an enlarged plan view of the computing device 10 displaying a QR Code 74 created in response to pressing, touching or otherwise operating the button 72.

FIG. 7 is an enlarged plan view of the computing device 10 displaying a message "ACCESS GRANTED" 76 which indicates that the user is authorized to access a service, for example, the security service. Alternatively, a message that reads "ACCESS DENIED" may be displayed when the user is not authorized to access a service. It is contemplated by the present disclosure that the computing device 10 may alternatively display any message that indicates the user is authorized or not authorized to access any location.

FIG. 8 is a top view of an example train platform 78 including a train 80 on each side of the platform 78. The train is an example mode of transportation. Each train 80 includes standard cars 82 and a car 84 reserved for users who desire to practice social distancing from other users. The trains 80 may include any number of standard cars 82 and any number of reserved cars 84. Additionally, a scanner 86 can be located at the entry to each car 84. Some airports are known to use trains to transport people to and between terminals. Thus, it is contemplated by the present disclosure that the train platform 78 may be located in an airport or other transportation hub like a train station.

Users are required to present a valid electronic credential to access the reserved car 84. Thus, as users arrive at a scanner 86 on the platform 78 he or she touches, presses or otherwise operates the button 72 to create and display an electronic token which is presented to the scanner 86 for scanning. Alternatively, the electronic token created for accessing the security service in the area 64 may be scanned. The electronic token for accessing the security service in the area 64 has a finite life, for example, half an hour. It is contemplated by the present disclosure that the life of the electronic token for accessing the security service in the area 64 may be any length of time in which a user may conveniently pass through the security checkpoint 200 and then board a reserved train car 84 without rushing, for example, within the range of about ten to forty-five minutes.

The scanner 86 can transmit the scanned token and/or data about the token, to the verification server 12 which can determine whether or not the token is valid. If valid, a message can be transmitted to the scanner 86 indicating the token is valid and the user associated with the token is authorized to board the car 84. Otherwise, if the token is invalid a message is transmitted to the scanner 86 indicating the token is invalid and authorization to board the car 84 is denied. Thus, access control to the car 84 is enhanced.

Although the scanner 86 can transmit the scanned token and/or data about the token to the verification server 12 after scanning the electronic token, the scanner 86 may alternatively transmit the scanned token and/or data about the token to the computing device 10. Thus, it is contemplated by the present disclosure that the computing device 10 may alternatively determine whether or not the token is valid and as a result determine that the user is authorized or not authorized to board the car 84. The computing device 10 may also transmit a message to the scanner 86 indicating the user is authorized or not authorized to board the car 84. After receiving the message, the scanner 86 permits or does not permit a user to board the car 84 according to the message. Additionally, the computing device 10 and/or the scanner 86 may display a message indicating the user is authorized or not authorized to board the car 84. Thus, access control to the car 84 is enhanced.

Figure 9:
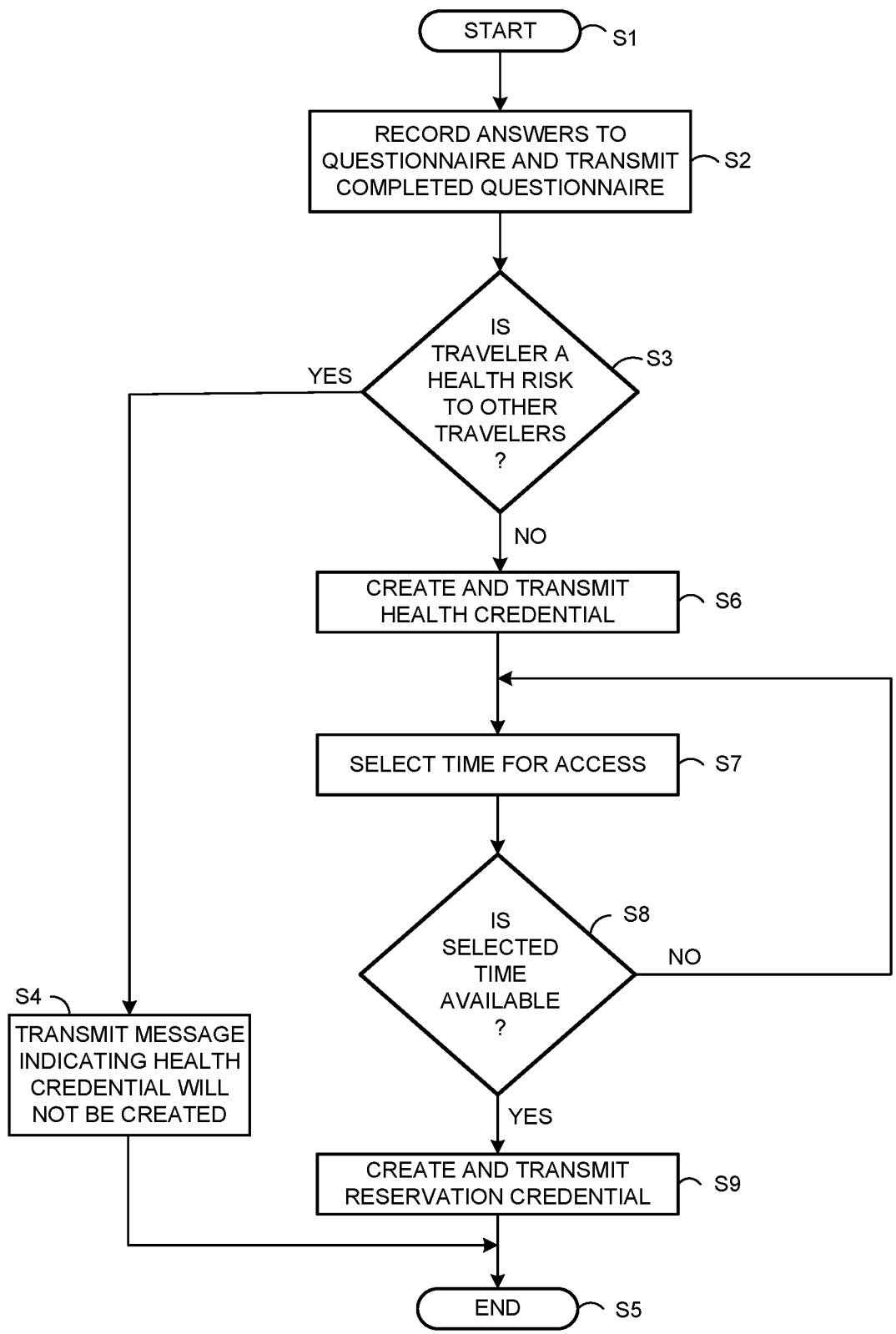
FIG. 9 is an example method and algorithm for creating a health credential and a reservation credential according to an embodiment of the present disclosure.

FIG. 9 is an example method and algorithm for creating a health credential and a reservation credential according to an embodiment of the present disclosure. FIG. 9 illustrates example operations performed when the processor 18 executes software stored in the memory 20 and the processor 34 executes software stored in the memory 36 to create a health credential and a reservation credential.

The method and algorithm start in step S1, then in step S2 the software executed by the processor 18 causes the computing device 10 to record answers to a health questionnaire entered by a user and transmit the completed questionnaire to the verification server 12 via the network 16. In response to receiving the completed questionnaire, in step S3, the software executed by the processor 34 causes the verification server 12 to determine if the user constitutes a health risk to others based on the completed questionnaire. The verification server 12 determines a user does not constitute a health risk when the answers in the completed questionnaire evidence the user presents little or no risk of facilitating transmission of a pathogen to others.

Upon determining the user constitutes a health risk to others, in step S4, the verification server 12 transmits via the network 16 to the computing device 10 a message indicating a health credential will not be created for the user. Next, in step S15, the method and algorithm end. However, upon determining the user does not constitute a health risk to others, in step S6, the software executed by the processor 34 causes the verification server 12 to create a health credential and transmit the health credential to the computing device 10 via the network 16. The computing device 10 receives the health credential and can store the health credential in the memory 20.

In step S17, the software executed by the processor 18 causes the computing device 10 to record a time period selected by the user for accessing a service, for example, the security service in the area 64 and transmits the selected time period to the verification server 12 using the network 16. In step S8, the software executed by the processor 34 causes the verification server 12 to determine if the selected period of time is available by comparing the selected period against available periods of time. If the selected period is not available, in step S7, another period of time is selected. However, if the selected period is available, in step S9, the verification server 12 creates a reservation credential and transmits via the network 16 the reservation credential to the computing device 10. The reservation credential can be stored in the memory 20. Next, in step S5, the method and algorithm end.

Although the health credential is created and received by the computing device 10 before the reservation credential in the method and algorithm described herein with reference to FIG. 9, it is contemplated by the present disclosure that the reservation credential may be created and received before the health credential. Moreover, it is contemplated by the present disclosure that the time between receiving and storing the health credential in the computing device 10 and selecting a time for accessing the security service in the area 64 may be any period of time.

Figure 10:
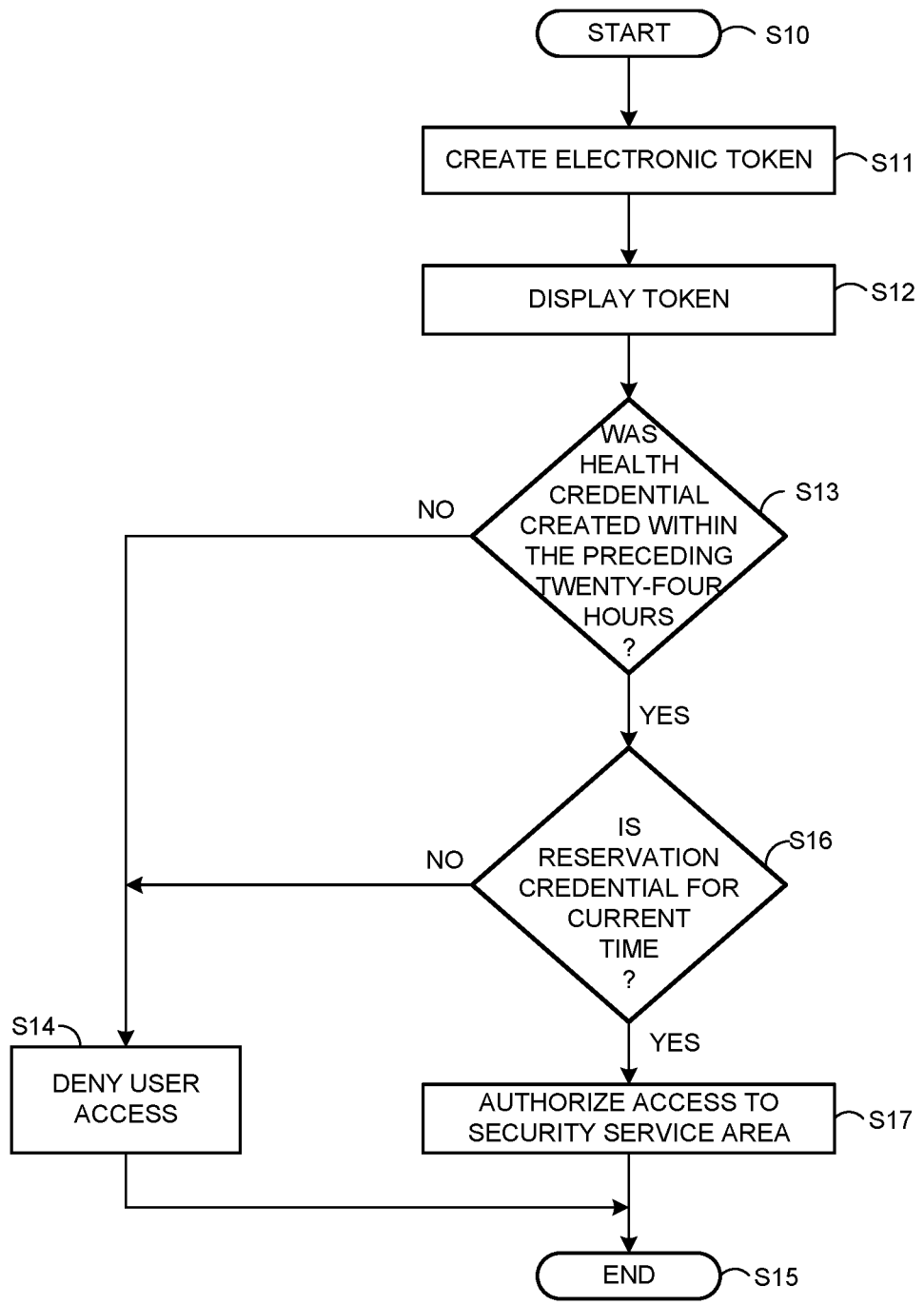
FIG. 10 is an example method and algorithm for enhanced user access control according to an embodiment of the present disclosure.

FIG. 10 is an example method and algorithm for enhanced access control according to an embodiment of the present disclosure. More specifically, FIG. 10 illustrates example operations performed when the processor 18 executes software stored in the memory 20 and the processor 34 executes software stored in the memory 36 for enhanced access control to a service, for example, the security service in the area 64.

The method and algorithm start in step S10, and then in step S11 the software executed by the processor 18 causes the computing device 10 to create an electronic token for the user based on the user's health and reservation credentials created according to the method and algorithm described herein with reference to FIG. 9. More specifically, when the user arrives at the ACMC 14, the user touches, presses or otherwise operates a button displayed by the computing device 10 that causes the computing device 10 to create an electronic token based on the user's health and reservation credentials. The button may be, for example, an icon that reads "Scan QR Code" or "Show QR Code" when the token is a QR code or "Scan the bar code" or "Show the Bar Code" when the token is a bar code. The electronic token may be any type of token, including, but not limited to, a QR code and a bar code. It is contemplated by the present disclosure that the token may include the user's email address, identifier of the computing device 10 associated with the user, and any other information relating to the user.

In step S12, the computing device 10 displays the electronic token for the ACMC 14 to scan, and the ACMC 14 transmits the scanned electronic token and/or data relating to the electronic token, to the verification server 12 using the network 16. Next, in step S13, software executed by the processor 34 causes the verification server 12 to determine whether or not the health credential for the user was created within the preceding twenty-four hours. If not, in step S14, the verification server 12 determines the electronic token is invalid so user access to the security service in the area 64 is denied. Thus, access control to the security service is enhanced. Next, in step S15, the method and algorithm end.

However, if the health credential was created within the preceding twenty-four hours, in step S16, the software executed by the processor 34 causes the verification server 12 to determine whether or not the user's reservation credential is for the current time. If not, in step S14, the verification server 12 determines the electronic token is invalid so user access to the security service in the area 64 is denied. Thus, access control to the security service is enhanced. Next, in step S15, the method and algorithm end. It is contemplated by the present disclosure that when the health credential or the reservation credential is invalid, a message may be displayed by the computing device 10 indicating access to the security service in the area 64 is denied.

However, if the verification server 12 determines that the reservation credential is for the current time, the electronic token is considered valid. A message indicating the user is authorized to access the security service in the area 64 can be transmitted to the ACMC 14 and the computing device 10. The message can be displayed by the computing device 10 for the user to see. Next, in step S17, the ACMC 14 transmits a message to the ACM 17 indicating the user is authorized to access the security service. In response the ACM 17 operates the mechanism 66 to permit access to the security service in the area 64. Thus, access control to the security service is enhanced. Next, in step S15, the method and algorithm end.

Although the ACMC 14 transmits the scanned token and/or data about the token to the verification server 12 after scanning the electronic token in the method and algorithm described herein with regard to FIG. 10, the ACMC 14 may alternatively transmit the scanned token and/or data about the token to the computing device 10. Thus, it is contemplated by the present disclosure that the computing device 10 may alternatively determine whether or not the token is valid and as a result that the user is authorized or not authorized to access the security service in the area 64. The computing device 10 may transmit a message to the ACM 17 indicating the user is authorized or not authorized to access the security service in the area 64. After receiving the message, the ACM 17 operates the mechanism 66 according to the received message. Thus, access control to the security service is enhanced. Additionally, the computing device 10 may display a message indicating the user is authorized or not authorized to access the security service.

Figure 11:
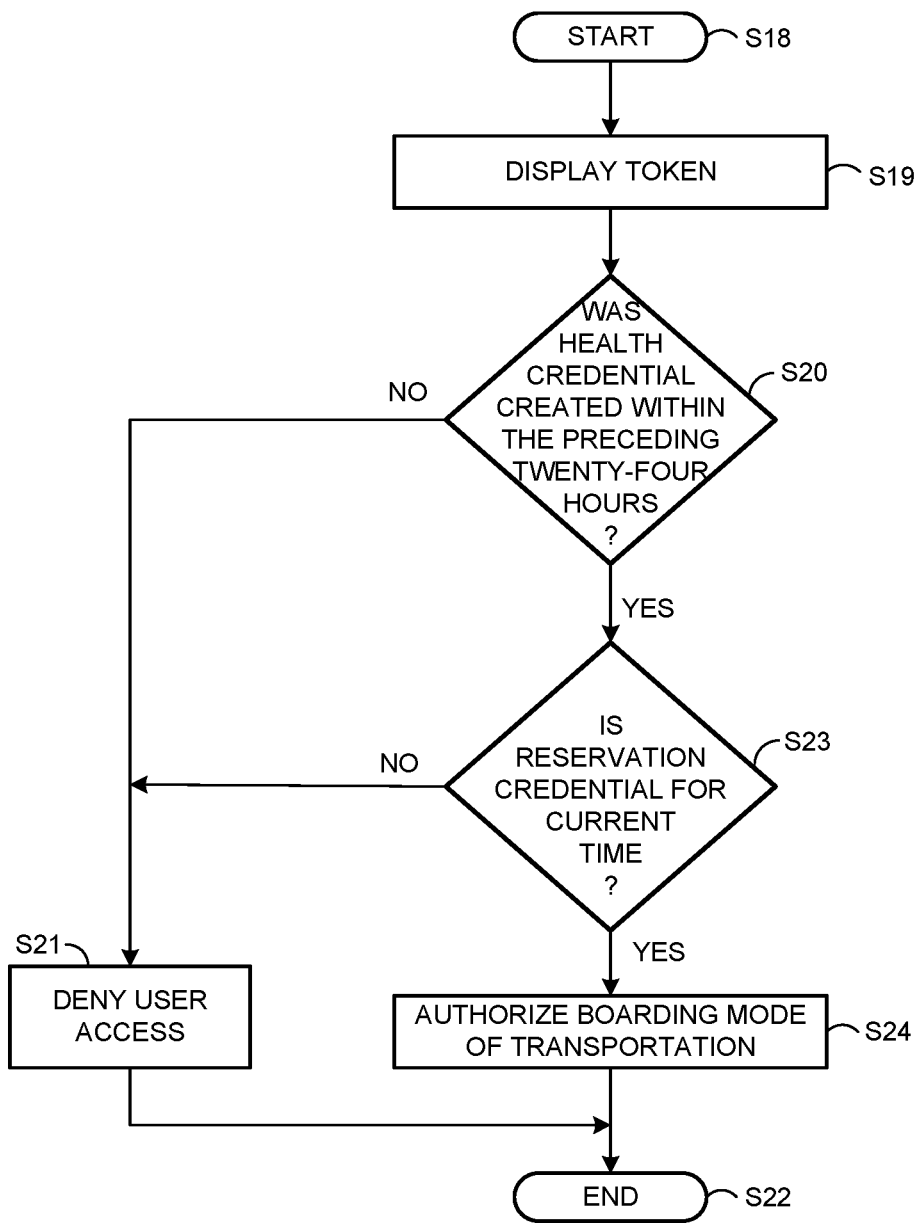
FIG. 11 is another example method and algorithm for enhanced user access control according to an embodiment of the present disclosure.

FIG. 11 is another example method and algorithm for enhanced access control according to an embodiment of the present disclosure. FIG. 11 illustrates other example operations performed when the processor 18 executes software stored in the memory 20 and the processor 34 executes software stored in the memory 36 for enhanced access control to a mode of transportation in a transportation hub, for example, the train 80.

The method and algorithm start in step S16, and then in step S19 the software executed by the processor 18 causes the computing device 10 to display the electronic token created using the method and algorithm described herein with reference to FIG. 9. The electronic token is scanned by the ACMC 14 which can transmit the scanned electronic token and/or data relating to the electronic token to the verification server 12 using the network 16.

Next, in step S20, software executed by the processor 34 causes the verification server 12 to determine whether or not the user's health credential was created within the preceding twenty-four hours. If not, in step S21, the verification server 12 determines the health credential is invalid so access to the reserved train car 84 is denied and the user is not authorized to board the car 84. Thus, access control to the car 84 is enhanced. Next, in step S22, the method and algorithm end. However, if the health credential was created within the preceding twenty-four hours, in step S23, the verification server 12 determines whether or not the user's reservation credential is for the current time. If not, in step S21, the verification server 12 determines the electronic token is invalid so access to the reserved train car 84 is denied and the user is not authorized to board the car 84. Thus, access control to the car 84 is enhanced. Next, in step S22, the method and algorithm end. It is contemplated by the present disclosure that when the health credential or the reservation credential is invalid, a message may be displayed by the computing device 10 indicating the user is not authorized to board the reserved train car 84.

However, if the verification server 12 determines that the reservation credential is for the current time, in step S24, the electronic token is deemed valid so the user is authorized to board the reserved train car 84. A message indicating the user is authorized to board the train 84 may be displayed by the computing device 10. Next, in step S22, the method and algorithm end.

Although the scanner 86 transmits the scanned token and/or data about the token to the verification server 12 after scanning the electronic token in the method and algorithm described herein with reference to FIG. 11, the scanner 86 may alternatively transmit the scanned token and/or data about the token to the computing device 10. Thus, it is contemplated by the present disclosure that the computing device 10 may alternatively determine whether or not the token is valid and as a result determine whether or not the user should be granted access to the car 84. The computing device 10 may also transmit a message to the scanner 86 indicating the user is authorized or not authorized to board the car 84. After receiving the message, the scanner 86 permits or does not permit a user to board the car 84 according to the message. Additionally, the computing device 10 and/or the scanner 86 may display a message indicating the user is authorized or not authorized to board the car 84.

Although the health credential is deemed invalid if not created within the preceding twenty-four hours, it is contemplated by the present disclosure that the health credential may alternatively be created within any period of time before scanning the electronic token by the scanner 86 that enables reducing user inconvenience and frustration and inhibits the spread of a pathogen like the coronavirus. Although the electronic token is created based on the health and reservation credentials as described herein, it is contemplated by the present disclosure that the electronic token may alternatively be created based on any type or combination of credentials and that such credentials may be created from information different than health and reservation information.

Commercial and non-commercial entities like transportations hubs and governments are known to issue forms of identification to, for example, employees and people who use services provided at their facilities. One form of identification typically used is a badge which can be, for example, attached to clothing or attached to a chain put around a person's neck. Badges generally include, amongst other things, the name and photograph of the person to whom the badge was issued. Typically, badges are checked by an automated security system or by security personnel in order to access services provided at the facility. However, it is easy and inexpensive to make fraudulent badges, for example, by modifying a genuine badge to include a different name, photograph, or both. Fraudulent badges compromise security of facilities and of services available at the facilities.

To address this problem, the computing device 10 can display buttons that each correspond to a different service. When the computing device 10 receives input regarding a selected service, the credentials for the service can be transmitted to the ACMC 14. In response to receiving the credentials, a camera can capture facial image data of a user and a determination can be made regarding whether the facial image data was taken of a live person. If the facial image data was taken of a live person, a verification transaction can be conducted based on the credential and the facial image data. When the user is successfully verified, the user can be granted access to the selected service.

If the liveness detection or the verification transaction are unsuccessful, the user is not authorized to access the selected service. Thus, access control to the selected service is enhanced.

Figure 12:
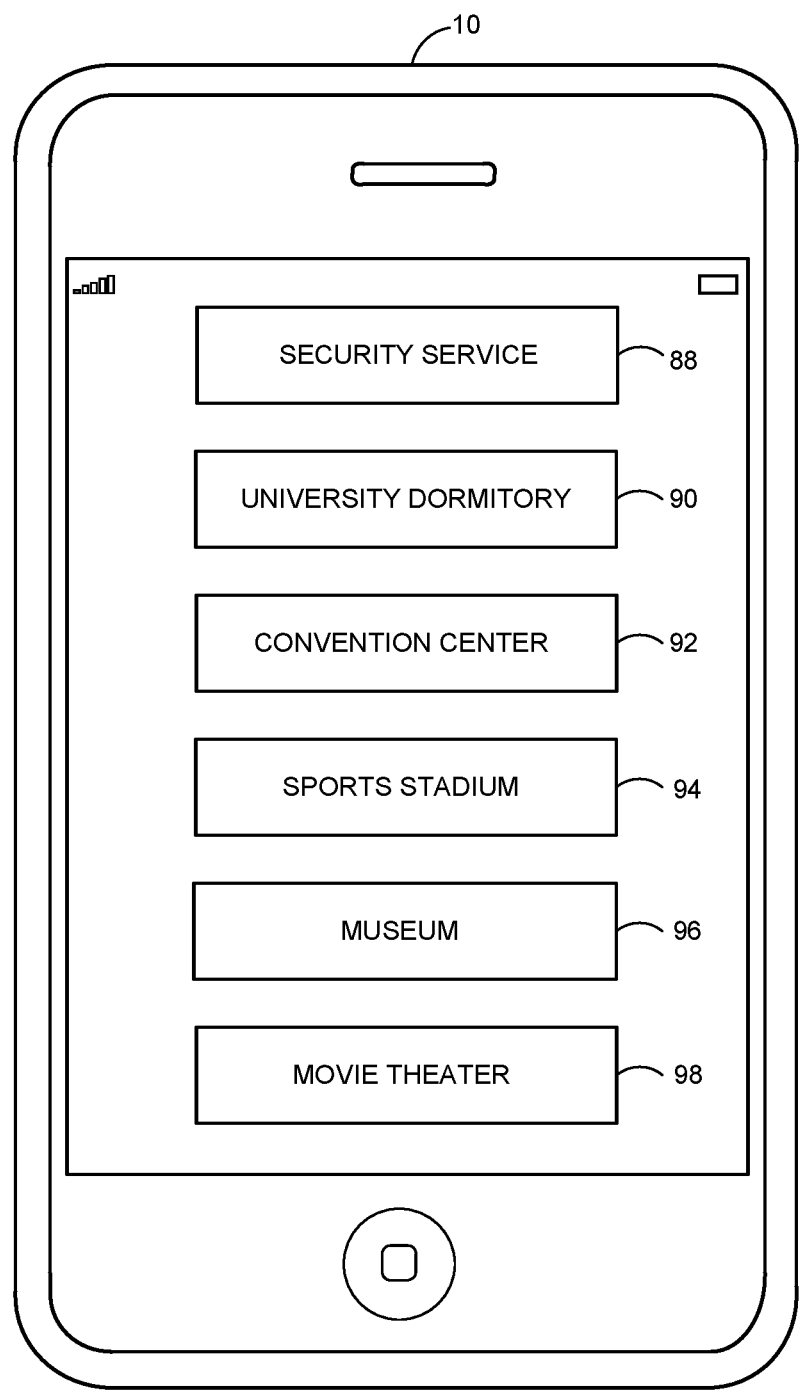
FIG. 12 is an enlarged plan view of the computing device displaying example buttons.

FIG. 12 is an enlarged plan view of the computing device 10 displaying example buttons 88, 90, 92, 94, 96, 98 that are each for accessing a different service. More specifically, the buttons 88, 90, 92, 94, 96, 98 are for accessing the security service, a university dormitory, a convention center, a sports stadium, a museum, and a movie theater, respectively. Although six example buttons are displayed by the computing device 10, it is contemplated by the present disclosure that any number of buttons may be displayed. Moreover, the buttons may be scrolled up and/or down to display additional different buttons.

In order to access the service associated with each button, the credentials for accessing the service should be provided. Thus, each of the buttons 88, 90, 92, 94, 96, 98 corresponds to one or more credentials required for accessing the respective service. More specifically, the button 88 corresponds to one or more credentials required to access the security service, the button 90 corresponds to one or more credentials required to access services available at a university dormitory, the button 92 corresponds to one or more credentials required to access services at a convention center, the button 94 corresponds to one or more credentials required to access services available at a sports stadium, the button 96 corresponds to one or more credentials required to access services available at a museum, and the button 98 corresponds to one or more credentials required to access services available at a movie theater.

Credentials can be any information about a person including, but not limited to, test results for a pathogen, a vaccination card, biometric data, a biometric credential, and government mandated immigration entry forms. It is contemplated by the present disclosure that the verification server 12 may also create a credential from any of this information alone or in combination. For example, the verification server 12 can create biometric credentials from facial image data captured by the computing device 10.

It is contemplated by the present disclosure that any of the credentials may be used for accessing any of the services. That is, the credentials may be mixed and matched to access any of the services. For example, the credentials for accessing the sports stadium and convention center may be a biometric credential and a vaccination card evidencing vaccination against a pathogen. Additionally, the credentials for accessing the museum may be a positive test result for a pathogen and a vaccination card while the credentials for accessing the university dormitory may be a biometric credential only.

Services available at a convention center include, but are not limited to, entertainment services like a concert. Services available at a sports stadium include, but are not limited to, entertainment services like baseball games and concerts.

Services available at a museum include, but are not limited to, educational services. Services available at a movie theater include, but are not limited to, entertainment services like movies.

The computing device 10 may be operated to display the buttons 88, 90, 92, 94, 96, 98 when the user desires access to any of the services. For example, when access to a dormitory is desired the button 90 is pressed, touched or otherwise operated to thus enable accessing the dormitory. As a result of pressing, touching, or otherwise operating a button 88, 90, 92, 94, 96, 98, the user enters input that selects a service.

The credential for accessing the security service in the area 64 may require biometric modality data and thus be considered a biometric credential. A biometric credential may be encrypted biometric data cryptographically signed, for example, by the verification server 12 or the ACMC 14 to evidence the provenance of the credential and that the credential has not been modified since creation. Additionally, biometric credentials can include a unique identifier for the user whose biometric template or biometric modality data is included in the credential. The unique user identifier is a string of characters, for example letters or numbers. The unique user identifier may include any type of character and may be, for example, all numbers, all letters, and alphanumeric. The unique user identifier may be of any length.

Figure 13:
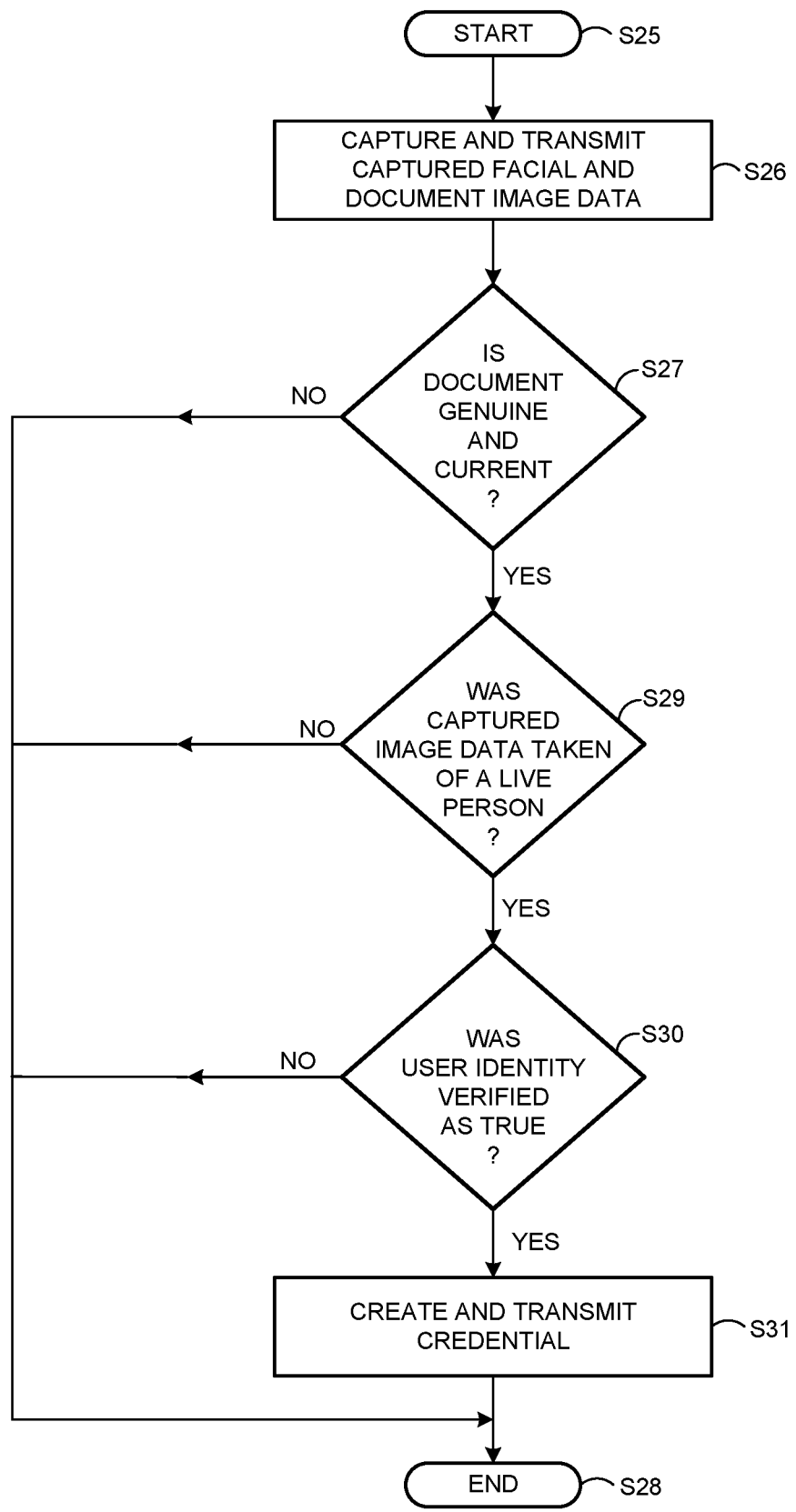
FIG. 13 is an example method and algorithm for creating a biometric credential.

FIG. 13 is an example method and algorithm for creating a biometric credential. FIG. 13 illustrates example operations performed when the processor 18 executes software stored in the memory 20 and the processor 34 executes software stored in the memory 36 to create a biometric credential.

The method and algorithm start in step S25 and then in step S26 the software executed by the processor 18 causes the computing device 10 to capture biometric data of a user and capture data of an identity document provided by the user, for example, a driver's license or a passport. The captured data includes facial image data and image data of the identity document. The captured data can be transmitted via the network 16 to the verification server 12. Alternatively, the captured data can be transmitted via the network 16 to the ACMC 14. Instead of transmitting the captured data, information about the captured data may be included in a QR Code which is transmitted to the verification server 12.

In this example method, the biometric data is biometric modality data of the user and the biometric modality is face. In step S27, the software executed by the processor 34 causes the verification server 12 to perform optical character recognition on the identity document image to determine if the document is genuine and has not expired. If the document is not genuine or has expired, a biometric credential is not created and, in step S28, the method and algorithm end. However, if the document is genuine and has not expired, in step S29, the software executed by the processor 34 causes the verification server 12 to determine whether or not the captured biometric data was taken of a live person using, for example, three-dimensional (3D) camera systems based on structural light techniques, depth perception techniques, and passive user liveness detection techniques, or any combination of these or other liveness detection techniques. Passive liveness techniques analyze biometric modality data, for example, facial image data, for artifacts indicative of a spoofing attack. For facial image data artifacts include, but are not limited to, a mask in an image, an imbalance in color in an image, less resonance in the facial area of an image compared to other areas of the image, and anything that is not a face, for example, a TV, car radio, or a computer printer.

When the captured biometric data is deemed not taken of a live person, the biometric data is considered to have been provided by an imposter so a credential is not created and, in step S28, the method and algorithm end. However, when the biometric data is deemed to have been taken of a live person, in step S30, the software executed by the processor 34 causes the verification server 12 to conduct a verification transaction. More specifically, the verification server 12 creates a biometric template from the captured biometric data and compares the created biometric template against a corresponding record biometric template for the user and calculates a matching score for the comparison. When the matching score is less than a threshold score, a biometric credential is not created, instead, in step S28 the method and algorithm end.

However, when the matching score at least equals the threshold score, in step S31, the verification server 12 cryptographically signs the created biometric template and couples the signed biometric template with a unique identifier to create a biometric credential. The created biometric template is cryptographically signed to evidence the provenance of the credential and that the credential has not been modified since creation. The verification server 12 can transmit via the network 16 the biometric credential to the computing device 10 which can store the credential in the memory 20. Next, in step S28, the method and algorithm end.

It is contemplated by the present disclosure that the ACMC 14 may alternatively implement all or some of the operations described herein as being performed by the verification server 12 in the method and algorithm described herein with regard to FIG. 10. For example, the ACMC 14 can receive the captured data, check that the identity document is genuine and current, confirm the captured biometric data was taken of a live user, and conduct the verification transaction. As another example, the ACMC 14 can receive the captured data, check that the identity document of the user is genuine and current, and confirm the captured biometric data was taken of a live user, while the verification server 12 conducts the verification transaction.

Communication between the computing device 10 of the user and the ACMC 14 may occur via NFC, RFID, Bluetooth and the like only so a network connection from the computing device 10 is not necessary.

Figure 14:
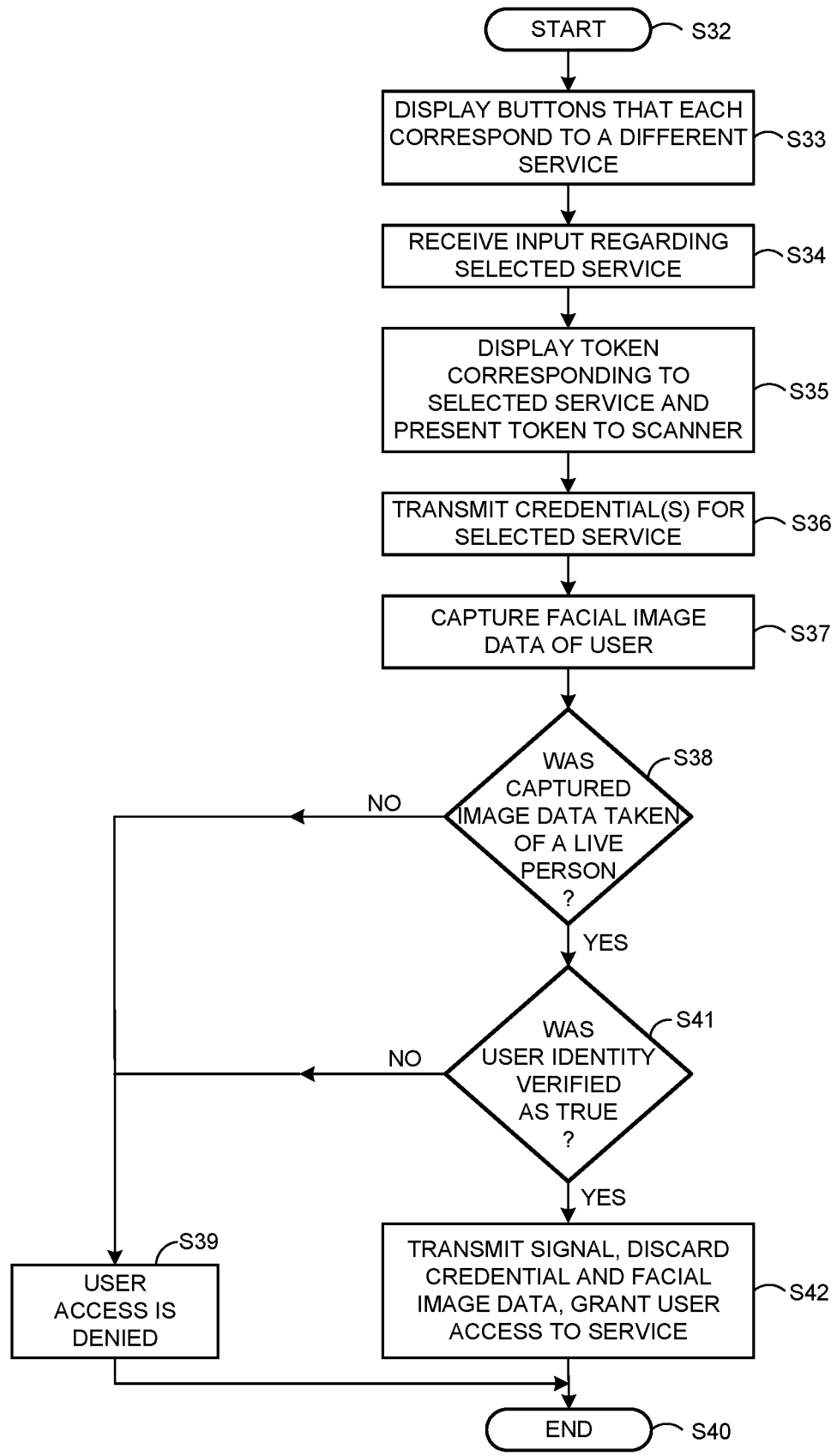
FIG. 14 is yet another example method and algorithm for enhanced user access control according to an embodiment of the present disclosure.

FIG. 14 is yet another example method and algorithm for enhanced access control according to another embodiment of the present disclosure. More specifically, FIG. 14 illustrates example operations performed when the processor 18 executes software stored in the memory 20 and the processor 46 executes software stored in the memory 48 for enhanced access control to a service, for example, entertainment services available at a movie theater.

The method and algorithm start in step S32, and then in step S33 the software executed by the processor 18 causes the computing device 10 to display buttons 88, 90, 92, 94, 96, 98 that each correspond to a different service. In step S34, the computing device 10 receives input regarding a selected service. Typically, a user presses, touches or otherwise operates one of the buttons 88, 90, 92, 94, 96, 98 to select the service to which access is desired. For this example method, access to entertainment services available at a movie theater is desired, so the button 98 is touched, pressed or otherwise operated to select entertainment services available at a movie theater.

Next, in step S35, the computing device 10 creates an electronic token based on the credentials for the selected service, and displays the token which is presented to the ACMC 14. The user can move the computing device 10 so the displayed token is scanned by the ACMC 14. Alternatively, the token can be scanned by the ACM 17. In step S36, the computing device 10 transmits the credentials for the selected service to the ACMC 14. The credentials for the entertainment services available at the movie theater include a biometric credential of the user.

In step S37, the camera 60 of the ACMC 14 captures facial image data of the user and the software executed by the processor 46 causes the ACMC 14 to determine whether or not the facial image data was taken of a live person. More specifically, the software executed by the processor 46 causes the ACMC 14 to analyze the facial image data using one or more liveness techniques, for example, passive liveness detection. Passive liveness techniques analyze the captured biometric modality data for artifacts indicative of a spoofing attack. Artifacts include, but are not limited to, a mask in an image, an imbalance in color in an image, less resonance in the facial area of an image compared to other areas of the image, and anything that is not a face, for example, a TV, car radio, or a computer printer.

Alternatively, any liveness detection algorithm and/or technique may be used to determine whether or not the facial image data was taken of a live person. Such algorithms and/or techniques include, but are not limited to, 3D camera systems using structured light techniques, depth perception analysis, and/or any combination of these and any other liveness detection technique.

If the facial image data is deemed not taken of live user the facial image data is considered the result of a spoof attack. As a result, in step S39, user access to the selected service is denied so the user is not permitted through the ACM 17. Thus, access control to the selected service is enhanced. Next, in step S40, the method and algorithm end.

However, if the facial image data is deemed to be of a live person, in step S41, the ACMC 14 creates a biometric template from the captured facial image data, extracts the biometric template of the user from the biometric credential of the user, compares the created and record templates against each other, and calculates a matching score for the comparison. If the matching score is less than a threshold score, the identity of the user is not verified as true, so in step S39 user access to the selected service is denied. Thus, access control to the selected service is enhanced. Next, in step S40, the method and algorithm end.

However, if the matching score at least equals the threshold score the identity of the user is verified as true. That is, the identity of the user is successfully verified so the user is granted access to the selected service. More specifically, in step S42, the ACMC 14 can transmit a message to the computing device 10 indicating the user is granted access to the selected service, and can discard the credentials for the selected service and the captured facial image data. The message can be displayed by the computing device 10 for the user to see. The message may also be transmitted to, for example, the ACM 17 or other access control device. In response to receiving the message, the ACM 17 can operate the mechanism 66 to facilitate access to the selected service. Thus, access control to the selected service is enhanced. Next, in step S40, the method and algorithm end.

It is contemplated by the present disclosure that some or all of the operations performed by the ACMC 14 with regard to the method and algorithm described herein with regard to FIG. 14, may alternatively be performed by the verification server 12.

Using the methods and algorithms for enhanced access control facilitates reducing user delays and related user inconvenience and frustration associated with accessing desired services, facilitates reducing risks that users will contract a pathogen like the coronavirus while accessing a desired service, for example, traveling, and enhances security.

The example methods and algorithms described herein may be conducted entirely by the computing device 10, partly by the computing device 10 and partly by the verification server 12 via the network 16, or partly by the computing device 10 and the ACMC 14 via the network 16. Additionally, the methods and algorithms described herein may be conducted partly by the computing device 10, partly by the verification server 12 and partly by the ACMC 14 via the network 16. For example, the ACMC 14 may determine whether the facial image data was taken of a live person while the verification server 12 may conduct verification transactions, or vice versa. Moreover, the example methods described herein may be conducted entirely on other computer systems (not shown) other computing devices 10 (not shown). Thus, it should be understood that it is contemplated by the present disclosure that the example methods and algorithms described herein may be conducted using any combination of computers, computer systems, and computing devices (not shown). Furthermore, data described herein as being stored in the memory 20 may alternatively be stored in any computer system (not shown) or computing device 10 (not shown) operable to communicate with the computing device 10 over the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. For example, in the method and algorithm described herein with regard to FIG. 14, transmitting the credentials for the selected service in step S36 may alternatively occur after facial image data is captured in step S37. Moreover, the method and/or algorithm steps may be performed in real time or in near real time. It should be understood that, for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhanced access control comprising the steps of:
   displaying buttons, by an electronic device, each button corresponding to a different service;
   receiving via one of the displayed buttons, by the electronic device, input regarding a selected one of the different services;

transmitting credentials for accessing the selected service to a computer, the credentials including at least a biometric credential for a user and a credential created from a test result for a pathogen for the user;

capturing, by a camera in communication with the computer, an image of the face of the user;

analyzing the captured facial image for artifacts indicative of a spoofing attack and determining whether the facial image was taken of a live person based on the analysis;

in response to determining the facial image was taken of a live person, conducting a verification transaction using the biometric credential and data based on the captured facial image; and in response to verifying the identity of the user as true, granting the user access to the selected service.

2. The method according to claim 1, said determining step comprising determining, using the computer, whether the facial image was taken of a live person.

3. The method according to claim 1, said determining step comprising determining, using a different computer, whether the facial image was taken of a live person.

4. The method according to claim 1, said conducting a verification transaction step comprising conducting, using the computer, the verification transaction using the biometric credential and data based on the captured facial image.

5. The method according to claim 1, said conducting a verification transaction step comprising conducting, using a different computer, the verification transaction using the biometric credential and data based on the captured facial image.

6. A method according to claim 1 further comprising the step of discarding the biometric credential and the captured facial image when the identity of the user is verified as true.

7. A method according to claim 1, wherein the biometric credential is cryptographically signed biometric data of the user.

8. A computer for enhanced access control comprising:
a processor; and
a memory configured to store data, said computer being associated with a network and said memory being in communication with said processor and having instructions stored thereon which, when read and executed by said processor, cause said computer to:

display buttons, each button corresponding to a different service;

receive via one of the displayed buttons input for a selected one of the different services and credentials including a biometric credential and a credential created from a test result for a pathogen for the user;

receive an image of the face of the user;

analyze the received facial image for artifacts indicative of a spoofing attack to determine based on the analysis whether the received facial image was taken of a live person;

in response to determining the received facial image was taken of a live person, conduct a verification transaction using the biometric credential and data based on the received facial image; and in response to verifying the identity of the user as true, grant the user access to the service.

9. A computer according to claim 8, wherein the instructions when read and executed by said processor, cause said computer to discard the biometric credential and the received facial image in response to verifying the identity of the user as true.

10. A computer according to claim 8, wherein the biometric credential is cryptographically signed biometric data of the user.

11. A non-transitory computer-readable recording medium in a computer for enhanced authorization for user access, the non-transitory computer-readable recording medium storing instructions which when executed by a hardware processor cause the non-transitory recording medium to perform steps comprising:

displaying buttons, each button corresponding to a different service;

receiving via one of the displayed buttons input for a selected one of the different services and credentials for accessing the selected service, the credentials including at least a biometric credential for a user and a credential created from a test result for a pathogen for the user;

receiving an image of the face of the user;

analyzing the facial image for artifacts of a spoofing attack and determining based on the analysis whether the received facial image was taken of a live person;

in response to determining the received facial image was taken of a live person, conducting a verification transaction using the biometric credential and data based on the received facial image; and in response to verifying the identity of the user as true, granting the user access to the service.

12. The non-transitory computer-readable recording medium according to claim 11, wherein the instructions when read and executed by said processor, cause said computer to discard the received biometric credential and the received facial image in response to verifying the identity of the user as true.

13. A non-transitory computer-readable recording medium according to claim 11, wherein the biometric credential is cryptographically signed biometric data of the user.

* * * * *